United States Patent
Chen et al.

(10) Patent No.: US 12,236,660 B2
(45) Date of Patent: Feb. 25, 2025

(54) MONOCULAR 2D SEMANTIC KEYPOINT DETECTION AND TRACKING

(71) Applicant: TOYOTA RESEARCH INSTITUTE, INC., Los Altos, CA (US)

(72) Inventors: Haofeng Chen, Stanford, CA (US); Arjun Bhargava, San Francisco, CA (US); Rares Andrei Ambrus, San Francisco, CA (US); Sudeep Pillai, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 463 days.

(21) Appl. No.: 17/390,744

(22) Filed: Jul. 30, 2021

(65) Prior Publication Data
US 2023/0031289 A1   Feb. 2, 2023

(51) Int. Cl.
*G06V 10/46* (2022.01)
*G06T 3/18* (2024.01)
(Continued)

(52) U.S. Cl.
CPC .............. *G06V 10/462* (2022.01); *G06T 3/18* (2024.01); *G06T 7/60* (2013.01); *G06T 9/00* (2013.01);
(Continued)

(58) Field of Classification Search
CPC ........ G06V 10/82; G06V 20/58; G06V 10/44; G06V 10/74; G06V 10/86; G06V 20/41; G06V 20/46; G06V 20/48; G06V 20/54; G06V 20/584; G06V 20/70; G06V 10/462; G06V 20/56; B60W 2554/80;
(Continued)

(56) References Cited

U.S. PATENT DOCUMENTS

| | | |
|---|---|---|
| 10,600,210 B1 | 3/2020 | Citraro et al. |
| 10,726,264 B2 | 7/2020 | Sawhney et al. |

(Continued)

FOREIGN PATENT DOCUMENTS

CN      115908486      *  4/2023  ............... G06T 7/13

OTHER PUBLICATIONS

Reddy et al., "Occlusion-Net: 2D/3D Occluded Keypoint Localization Using Graph Networks", 2019, IEEE Computer Society, pp. 7318-7327 (Year: 2019).*

(Continued)

*Primary Examiner* — Zhiyu Lu
(74) *Attorney, Agent, or Firm* — SEYFARTH SHAW LLP (57) ABSTRACT

A method for 2D semantic keypoint detection and tracking is described. The method includes learning embedded descriptors of salient object keypoints detected in previous images according to a descriptor embedding space model. The method also includes predicting, using a shared image encoder backbone, salient object keypoints within a current image of a video stream. The method further includes inferring an object represented by the predicted, salient object keypoints within the current image of the video stream. The method also includes tracking the inferred object by matching embedded descriptors of the predicted, salient object keypoints representing the inferred object within the previous images of the video stream based on the descriptor embedding space model.

17 Claims, 6 Drawing Sheets

(51) Int. Cl.
*G06T 7/60* (2017.01)
*G06T 9/00* (2006.01)
*G06V 20/40* (2022.01)
*G06V 20/56* (2022.01)

(52) U.S. Cl.
CPC .............. *G06V 20/46* (2022.01); *G06V 20/56* (2022.01); *G06T 2207/30236* (2013.01); *G06T 2207/30241* (2013.01); *G06T 2207/30248* (2013.01)

(58) Field of Classification Search
CPC . B60W 60/00; B60W 60/00274; G01S 17/66; G06F 16/7837; G06F 16/9024; G05D 1/0088; G05D 1/0214; G05D 1/0253; G05D 2201/0213; G06N 3/04; G06N 3/0454; G06N 3/08; G06T 2207/10016; G06T 2207/30261; G06T 7/248; G06T 2207/30236; G06T 2207/30241; G06T 2207/30248; G06T 3/0093; G06T 7/60; G06T 9/00

See application file for complete search history.

(56) References Cited

U.S. PATENT DOCUMENTS

| | | | | |
|---|---|---|---|---|
| 11,145,076 | B1* | 10/2021 | Horesh | H04N 23/61 |
| 2010/0238286 | A1* | 9/2010 | Boghossian | H04N 7/188 |
| | | | | 348/143 |
| 2012/0320095 | A1* | 12/2012 | Boghossian | G08B 13/1961 |
| | | | | 345/661 |
| 2012/0320201 | A1* | 12/2012 | Boghossian | H04N 7/188 |
| | | | | 348/143 |
| 2016/0117833 | A1* | 4/2016 | Krauss | G06T 7/194 |
| | | | | 382/173 |
| 2016/0125249 | A1* | 5/2016 | Mei | G06V 20/56 |
| | | | | 382/103 |
| 2017/0168488 | A1* | 6/2017 | Wierzynski | G05D 1/0274 |
| 2017/0178352 | A1* | 6/2017 | Harmsen | G05D 1/106 |
| 2017/0372575 | A1* | 12/2017 | Boghossian | H04N 7/188 |
| 2019/0065895 | A1* | 2/2019 | Wang | G06V 40/172 |
| 2019/0279014 | A1 | 9/2019 | Fang et al. | |
| 2019/0354105 | A1* | 11/2019 | Cunningham | G05D 1/0246 |
| 2020/0252600 | A1 | 8/2020 | Tseng et al. | |
| 2020/0317190 | A1* | 10/2020 | Tong | B60W 30/0956 |
| 2022/0027623 | A1* | 1/2022 | Fanghella | G06T 7/246 |
| 2022/0301104 | A1* | 9/2022 | Wang | G06T 15/005 |

OTHER PUBLICATIONS

Sarlin, et al., "SuperGlue: Learning Feature Matching with Graph Neural Networks," arXiv:1911.11763, Mar. 28, 2020.

Detone, et al., "SuperPoint: Self-Supervised Interest Point Detection and Description," arXiv:1712.07629, Apr. 19, 2018.

Christiansen, et al., "UnsuperPoint: End-to-end unsupervised interest point detector and descriptor," arXiv:1907.04011v1, Jul. 9, 2019.

Kreiss, et al., "PifPaf: Composite Fields for Human Pose Estimation," arXiv:1903.06593, Apr. 5, 2019.

Tang, et al., "Neural Outlier Rejection for Self-Supervised Keypoint Learning," arXiv:1912.10615v1, Dec. 23, 2019.

* cited by examiner

MONOCULAR 2D SEMANTIC KEYPOINT DETECTION AND TRACKING

BACKGROUND

Field

Certain aspects of the present disclosure generally relate to machine learning and, more particularly, a system and method for monocular 2D semantic keypoint detection and tracking.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. Detecting interest points in RGB images and matching them across views is a fundamental capability of many robotic systems. Unfortunately, conventional autonomous systems assume that salient keypoints can be detected and re-identified in diverse settings, which involves strong invariance to lighting, viewpoint changes, scale, etc. Until recently, these tasks have mostly relied on hand-engineered keypoint features, which have limited performance. That is, techniques for leveraging salient keypoints within a unique network architecture to facilitate detection and tracking are desired.

SUMMARY

A method for 2D semantic keypoint detection and tracking is described. The method includes learning embedded descriptors of salient object keypoints detected in previous images according to a descriptor embedding space model. The method also includes predicting, using a shared image encoder backbone, salient object keypoints within a current image of a video stream. The method further includes inferring an object represented by the predicted, salient object keypoints within the current image of the video stream. The method also includes tracking the inferred object by matching embedded descriptors of the predicted, salient object keypoints representing the inferred object within the previous images of the video stream based on the descriptor embedding space model.

A non-transitory computer-readable medium having program code recorded thereon for 2D semantic keypoint detection and tracking is described. The program code is executed by a processor. The non-transitory computer-readable medium includes program code to learn embedded descriptors of salient object keypoints detected in previous images according to a descriptor embedding space model. The non-transitory computer-readable medium also includes program code to predict, using a shared image encoder backbone, salient object keypoints within a current image of a video stream. The non-transitory computer-readable medium further includes program code to infer an object represented by the predicted, salient object keypoints within the current image of the video stream. The non-transitory computer-readable medium also includes program code to track the inferred object by matching embedded descriptors of the predicted, salient object keypoints representing the inferred object within the previous images of the video stream based on the descriptor embedding space model.

A system for 2D semantic keypoint detection and tracking is described. The system includes a semantic keypoint detection module to learn embedded descriptors of salient object keypoints detected in previous images according to a descriptor embedding space model. The system also includes a semantic keypoint descriptor module to predict, using a shared image encoder backbone, salient object keypoints within a current image of a video stream. The system further includes a keypoint inference model to infer an object represented by the predicted, salient object keypoints within the current image of the video stream. The system also includes a keypoint tracking module to track the inferred object by matching embedded descriptors of the predicted, salient object keypoints representing the inferred object within the previous images of the video stream based on the descriptor embedding space model.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Tracking of interest points within frames of a monocular video stream is an important perception task in the area of autonomous agents, such as driverless cars and robots. Detecting interest points in RGB images and matching them across views is a fundamental capability of many autonomous systems. Tasks such as structure-from-motion (SfM) and/or simultaneous localization and mapping (SLAM) assume that salient keypoints can be detected and re-identified in diverse settings. Until recently, these tasks have mostly relied on hand-engineered keypoint features, which have limited performance.

As described, semantic keypoints are points of interest with semantic meaning for objects in an image. For example, the right front taillight of a car, the left back taillight of the car, the front left tire hub of the car corresponding to a wheel contact point to the ground, and other like features of the car. Keypoints may represent interest points that are more low-level points that may not have clear semantic meaning, such as a corner point or ending point of a line segment. The keypoints may be detected using a keypoint heat map. As described, a keypoint heatmap identifies broad regions of an image where a keypoint is likely found based on a final prediction.

As described, these semantic keypoints may include salient vehicle keypoints that are consistent across an object class, such as a vehicle object class. For example, these salient vehicle keypoints include (1) wheels of a vehicle (e.g., four wheels contacting the ground); (2) taillights of the vehicle (e.g., right/left taillights at the back of the vehicle); (3) headlights of the vehicle (e.g., right/left headlights at the front of the vehicle); (4) license plates (e.g., at the front and/or rear of the vehicle); and/or other like features of the vehicle that are consistent across a vehicle object class.

Aspects of the present disclosure are directed to a 2D semantic keypoint detection and tracking model by learning 2D semantic keypoint detection and tracking from image frames. In some aspects, the 2D semantic keypoint detection and tracking model is composed of a shared encoder backbone, a keypoint detector head, and a keypoint descriptor head. In one configuration, the keypoint detector head feeds features from the shared encoder backbone to shared convolution layers followed by two fully-connected (FC) layers in parallel to predict a keypoint class score and an offset to a nearest keypoint for each respective pixel location of an input frame.

In some aspects of the present disclosure, the keypoint detector head is trained in a supervised manner. For example, the keypoint detector head is trained with keypoint classification trained using a focal loss. In addition, the keypoint detector head is trained to perform keypoint offsets using a smooth L1 loss. In aspects of the present, during inference, the predicted keypoint class scores and offset values are fused and input into a non-maxima suppression to produce final keypoint predictions.

In one aspect of the present disclosure, the 2D semantic keypoint detection and tracking system is composed of a shared image backbone. For example, the shared image backbone extracts relevant appearance and geometric features for semantic keypoint extraction by generating a keypoint heatmap. In some aspects, the disclosed architecture, further includes modeling detected salient vehicle keypoints which are consistent across a rigid-body object (ex: Car, Bus, Truck, etc.). This salient vehicle keypoints can be either predefined as prior, or learned in the proposed end-to-end framework. As such, this aspect of the present disclosure constrains keypoint detection based on the salient vehicle keypoints.

In one aspect of the present disclosure, the keypoint descriptor head takes in backbone features to produce 128-dimensional feature vectors for each pixel location. The descriptor head may be trained in a self-supervised manner. For example, during training a pair of homographies are sampled to warp the input image in two different manners. In this example, descriptor embeddings are trained using a triplet loss to encourage corresponding keypoints to have similar descriptors. Descriptor triplets are sampled using ground-truth keypoint coordinates and known homographic correspondence. In this aspect of the present disclosure, during inference on videos, predicted keypoints are matched with keypoints in previous frames using greedy matching in a descriptor embedding space.

Figure 1:
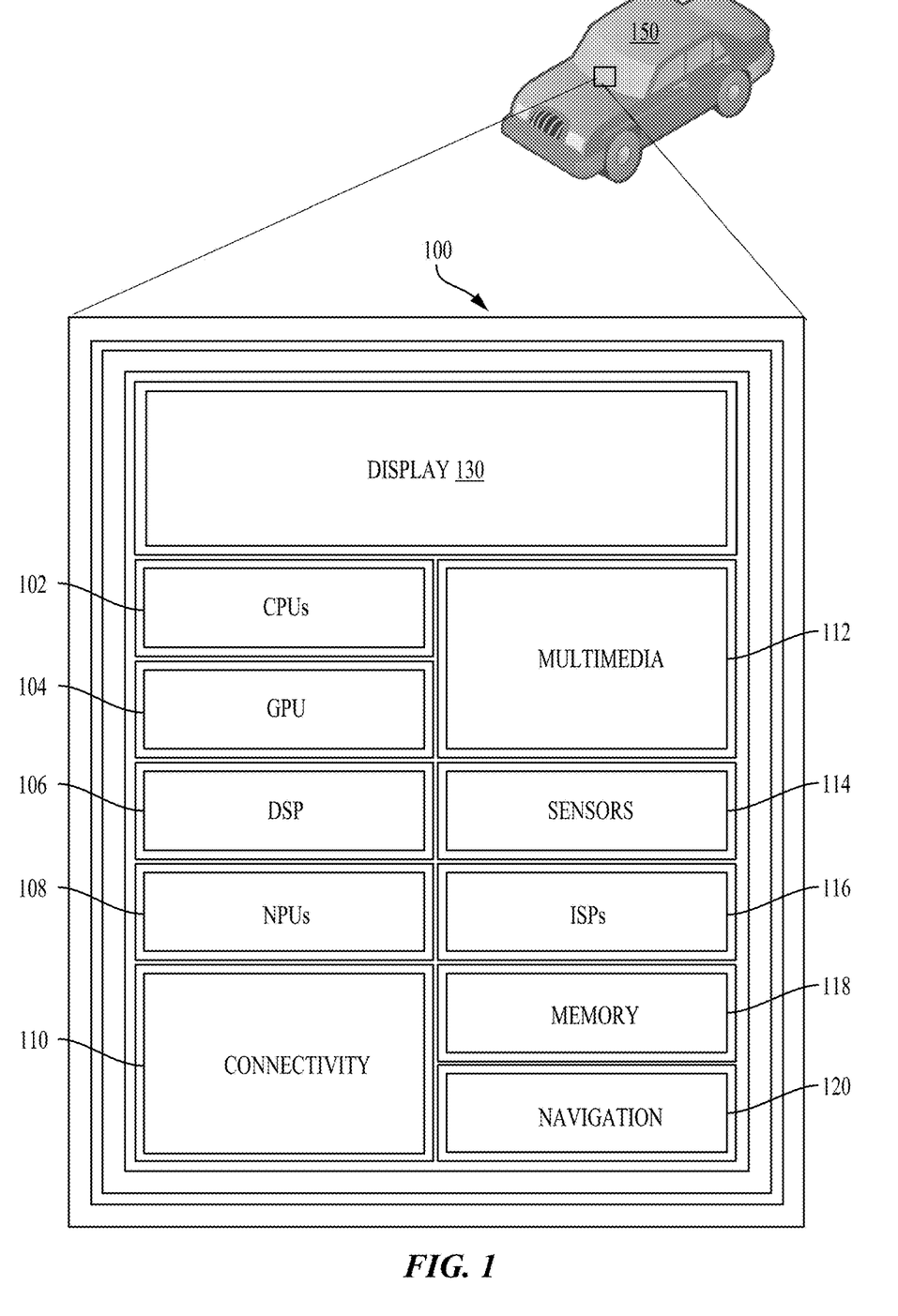
FIG. 1 illustrates an example implementation of designing a system using a system-on-a-chip (SOC) for monocular 2D semantic keypoint detection and tracking, in accordance with aspects of the present disclosure.

FIG. 1 illustrates an example implementation of the aforementioned system and method for monocular 2D semantic keypoint detection and tracking using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
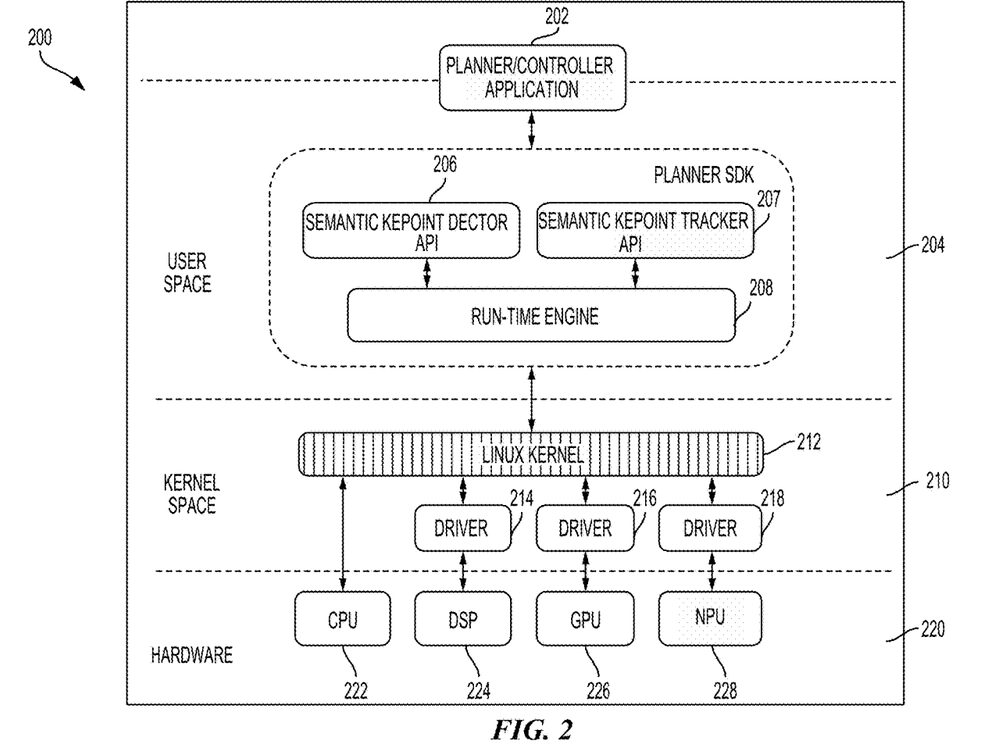
FIG. 2 is a block diagram illustrating a software architecture that may modularize functions for monocular 2D semantic keypoint detection and tracking, according to aspects of the present disclosure.

FIG. 2 is a block diagram illustrating a software architecture 200 that may modularize functions for monocular 2D semantic keypoint detection and tracking in subsequent frames of a video stream, according to aspects of the present disclosure. Using the architecture, a planner/controller application 202 may be designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for tracking semantic keypoints in subsequent frames of a video stream captured by a monocular camera of an ego vehicle. The planner/controller application 202 may make a request to compile program code associated with a library defined in a semantic keypoint detector application programming interface (API) 206 for semantic keypoint detection. The planner/controller application 202 may make a request to compile program code associated with a library defined in a semantic keypoint tracker API 207 for the task of tracking semantic keypoints in subsequent frames of a video stream captured by an autonomous agent.

A run-time engine 208, which may be compiled code of a runtime framework, may be further accessible to the planner/controller application 202. The planner/controller application 202 may cause the run-time engine 208, for example, to perform tracking of detecting semantic keypoints in subsequent frames of a monocular (single-camera) video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
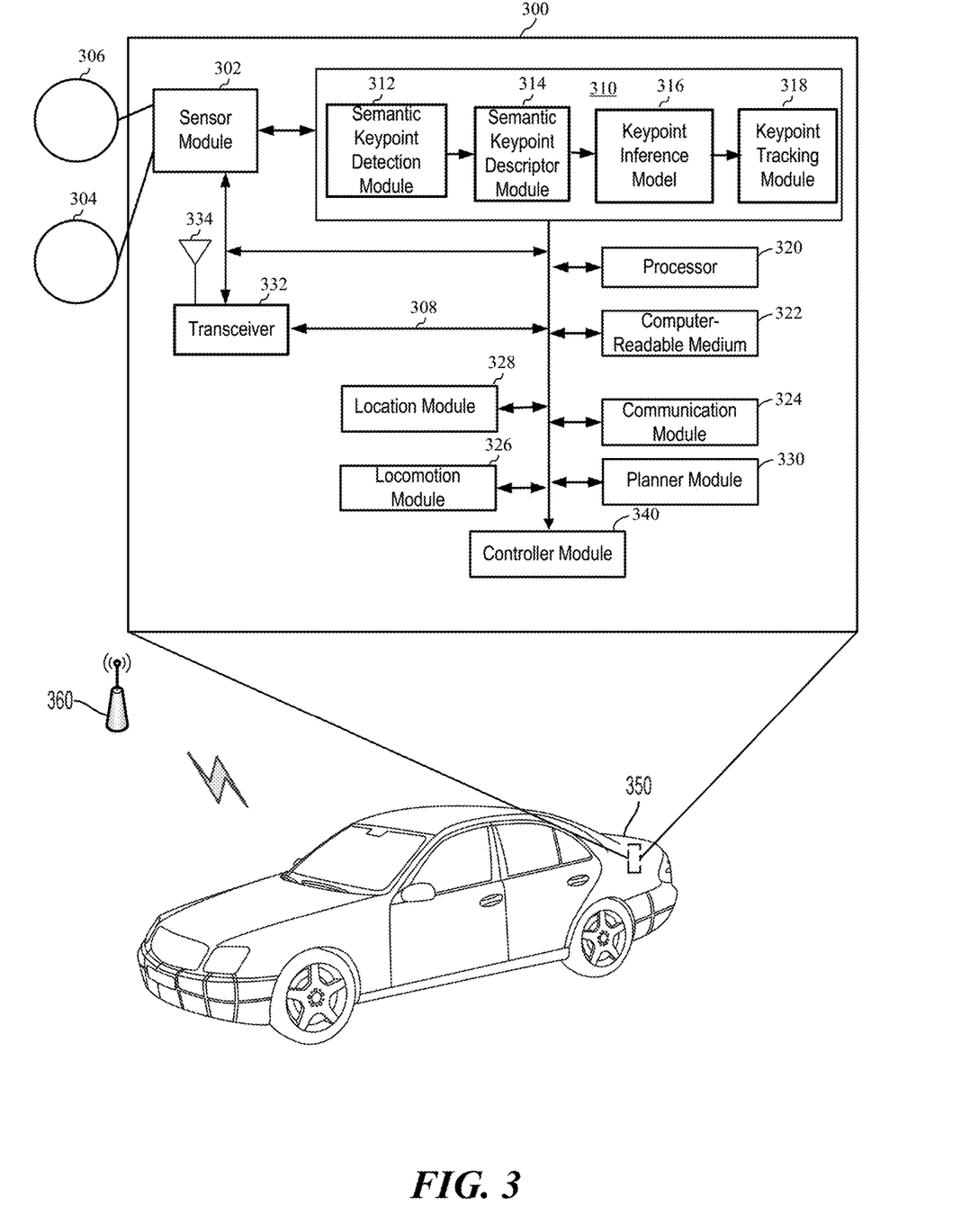
FIG. 3 is a diagram illustrating an example of a hardware implementation for a 2D semantic keypoint detection and tracking system, according to aspects of the present disclosure.

FIG. 3 is a diagram illustrating an example of a hardware implementation for a 2D semantic keypoint detection and tracking system 300, according to aspects of the present disclosure. The semantic keypoint detection and tracking system 300 may be configured for planning and control of an ego vehicle in response to vehicle keypoint tracking within subsequent frames of a monocular (single-camera) video stream captured during operation of a car 350.

The semantic keypoint detection and tracking system 300 may be a component of a vehicle, a robotic device, or other device. For example, as shown in FIG. 3, the semantic keypoint detection and tracking system 300 is a component of the car 350. Aspects of the present disclosure are not limited to the semantic keypoint detection and tracking system 300 being a component of the car 350, as other devices, such as a bus, motorcycle, or other like vehicle, are also contemplated for using the semantic keypoint detection and tracking system 300. The car 350 may be autonomous or semi-autonomous.

The semantic keypoint detection and tracking system 300 may be implemented with an interconnected architecture, represented generally by an interconnect 308. The interconnect 308 may include any number of point-to-point interconnects, buses, and/or bridges depending on the specific application of the semantic keypoint detection and tracking system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The semantic keypoint detection and tracking system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The semantic keypoint detection and tracking system 300 includes the processor 320 coupled to the computer-readable medium 322. The processor 320 performs processing, including the execution of software stored on the computer-readable medium 322 to provide keypoint tracking functionality, according to the present disclosure. The software, when executed by the processor 320, causes the semantic keypoint detection and tracking system 300 to perform the various functions described for ego vehicle perception based on semantic keypoint tracking between frame from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.9 GHz (review); EN 12795: 2002 Dedicated Short-Range Communication (DSRC)-DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fee Collection-Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the semantic keypoint detection and tracking system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The semantic keypoint detection and tracking system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Tracking of interest points within frames of a monocular video stream is an important perception task in the area of autonomous agents, such as autonomous operation of the car 350. Detecting interest points in RGB images and matching them across views is a fundamental capability of many robotic systems. As described, semantic keypoints are points of interest with semantic meaning for objects in an image. As described, these semantic keypoints may include salient vehicle keypoints that are consistent across an object class, such as a vehicle object class. For example, these salient vehicle keypoints include (1) wheels of a vehicle (e.g., four wheels contacting the ground); (2) taillights of the vehicle (e.g., right/left taillights at the back of the vehicle); (3) headlights of the vehicle (e.g., right/left headlights at the front of the vehicle); (4) license plate(s) (e.g., at the front and/or rear of the vehicle); and/or other like universal features of the vehicle. Although described with reference to vehicles, universal salient keypoints may be defined for other object classes. For example, a pedestrian object class includes labeling of a head, feet contact points with the ground, and other common features of a pedestrian.

Keypoints may represent interest points that are more low-level points that may not have clear semantic meaning, such as a corner point or ending point of a line segment. The salient vehicle keypoints may be detected using a keypoint heat map. As described, a keypoint heatmap identifies broad regions of an image where a keypoint is likely found based on a final prediction. In some aspects, keypoint descriptors are modeled within a descriptor embedding space to enable tracking of salient vehicle keypoints within subsequent frames of a video stream.

As shown in FIG. 3, the ego perception module 310 includes a semantic keypoint detection module 312, a semantic keypoint descriptor module 314, a keypoint inference model 316, and a keypoint tracking module 318. The semantic keypoint detection module 312, the semantic keypoint descriptor module 314, the keypoint inference model 316, and the keypoint tracking module 318 may be components of a same or different artificial neural network communicably coupled to a shared image backbone. The ego perception module 310 is not limited to the shared image backbone. The ego perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

The ego perception module 310 is configured to perform salient vehicle keypoint detection for the task of tracking an associated vehicle between monocular RGB images received from the first sensor 304 or the second sensor 306. According to aspects of the present disclosure, the semantic keypoint detection module 312 is configured to detect salient vehicle keypoints using a keypoint heatmap from a shared image backbone (not shown). In aspects of the present disclosure, the semantic keypoint descriptor module 314 is trained to generate a descriptor embedding space to associate salient vehicle keypoints across subsequent frames of an input video stream.

In some aspects of the present disclosure, the semantic keypoint descriptor module 314 takes in backbone features to produce 128-dimensional feature vectors for each pixel location. The semantic keypoint descriptor module 314 may be trained in a self-supervised manner. For example, during training, a pair of homographies are sampled to warp the input image in two different manners. The different manners of warping the sampled image define homographic correspondence corresponding to ground-truth keypoint coordinates. In this example, descriptor embeddings are trained using a triplet loss to encourage corresponding keypoints to have similar descriptors. Some aspects of the present disclosure use known transformations of salient vehicle keypoints to define embedded descriptors of the salient vehicle keypoints in subsequent images of a video stream. For example, known transformations (e.g., 90° rotation) are determined from multiple warping of a sample image. The descriptor embeddings are used to find corresponding keypoints in the warped images.

According to aspects of the present disclosure, descriptor triplets are sampled using the ground-truth keypoint coordinates and known homographic correspondence. According to aspects of the present disclosure, the keypoint inference model 316 and the keypoint tracking module 318 produce final keypoint predictions during inference on videos. For example, the keypoint tracking module 318 matches the predicted final keypoints with keypoints in previous frames using greedy matching in a descriptor embedding space to enable autonomous vehicle operation, as shown in FIG. 4.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 4:
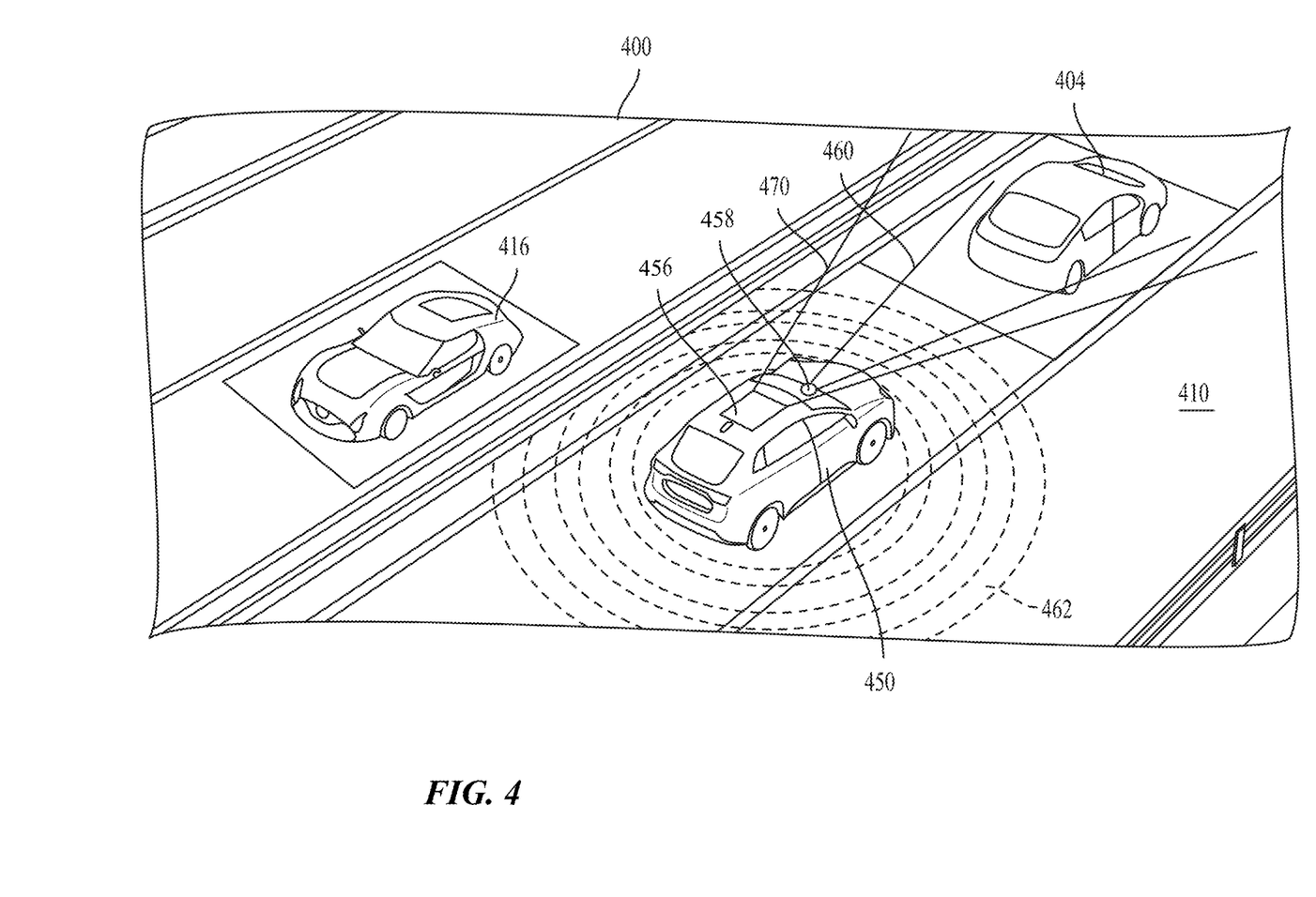
FIG. 4 is a drawing illustrating an example of an ego vehicle in an environment, according to aspects of the present disclosure.

FIG. 4 illustrates an example of an ego vehicle 450 (e.g., the car 350) in an environment 400 according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 458, such as a 2D RGB camera, and a second sensor 456. The second sensor 456 may be another RGB camera or another type of sensor, such as ultrasound, and/or RADAR, light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 458 captures a 2D image that includes objects in the 2D camera's 458 field of view 460. The second sensor 456 may generate one or more output streams. The 2D image captured by the 2D camera includes a 2D image of the first vehicle 404, as the first vehicle 404 is in the 2D camera's 458 field of view 460. A field of view 470 of the second sensor 456 is also shown.

The information obtained from the second sensor 456 and the 2D camera 458 may be used to navigate the ego vehicle 450 along a route when the ego vehicle 450 is in an autonomous mode. The second sensor 456 and the 2D camera 458 may be powered from electricity provided from the vehicle's 450 battery (not shown). The battery may also power the vehicle's motor. The information obtained from the second sensor 456 and the 2D camera 458 may be used to generate a 3D representation of an environment.

Aspects of the present disclosure are directed to an architecture that includes an end-to-end 2D semantic keypoint detector and tracker using the keypoint inference model 316 of FIG. 3. In this aspect, salient vehicle keypoints are identified and descriptors are embedded within the salient vehicle keypoints to enable keypoint tracking of an associated vehicle between frames. This architecture includes a descriptor embedding space model for salient vehicle keypoint tracking within previous fames of a video stream, for example, as shown in FIG. 5.

Figure 5:
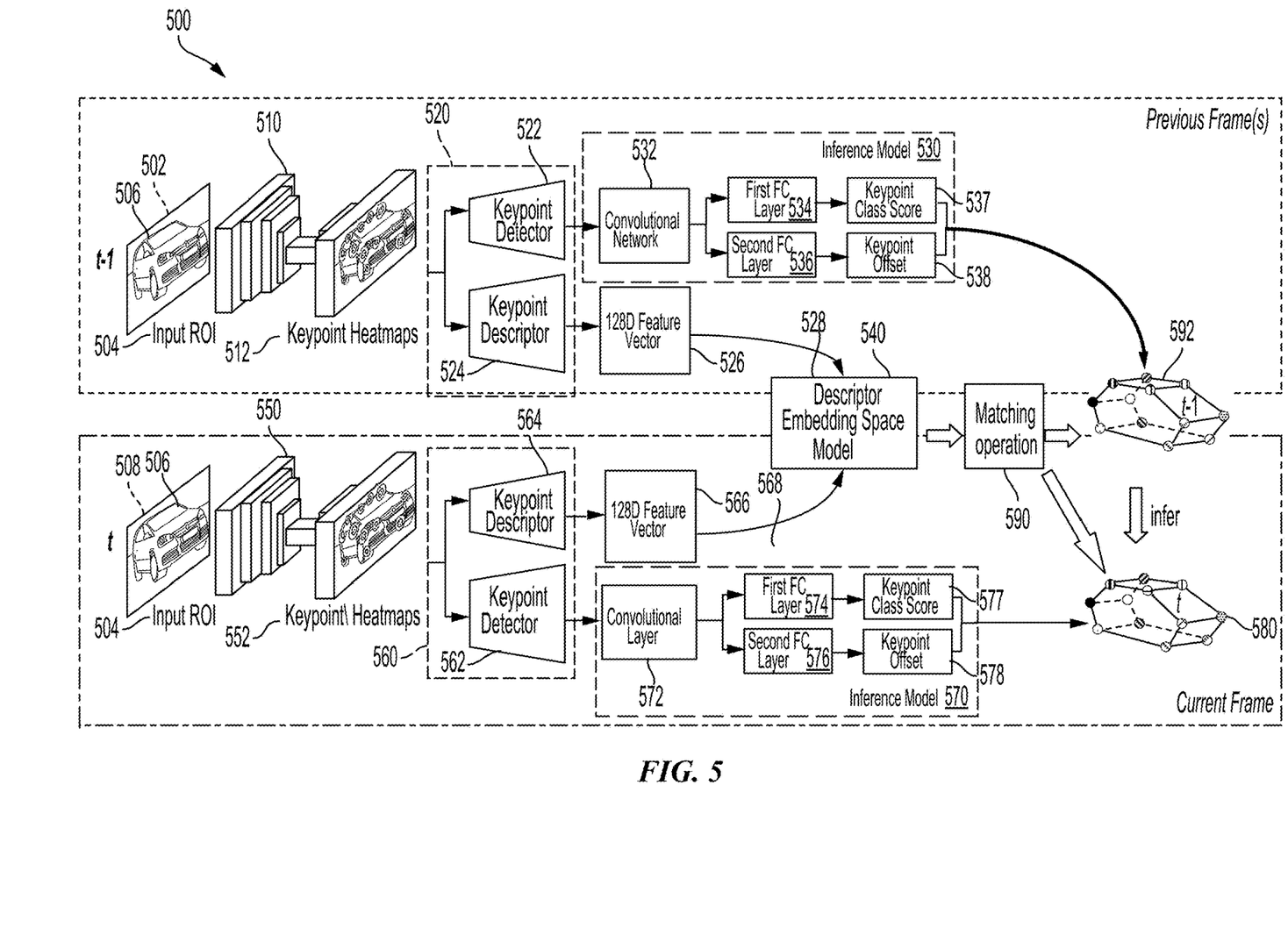
FIG. 5 is a block diagram illustrating a 2D semantic keypoint detection and tracking system between monocular images of a video stream, according to aspects of the present disclosure.

FIG. 5 is a block diagram of a 2D semantic keypoint detection and tracking architecture to match predicted keypoints with keypoints from previous frames using a descriptor embedding space, according to aspects of the present disclosure. In one aspect of the present disclosure, a 2D semantic keypoint detection and tracking framework 500 is used to implement the ego perception module 310 shown in FIG. 3 using, for example, a shared matching layer to enable keypoint tracking of an associated vehicle.

In aspects of the present disclosure, keypoint detection is modified by directing the detection based on salient vehicle keypoints. As described, these salient vehicle keypoints may include (1) wheel contact points to the ground of a vehicle; (2) taillights of the vehicle (e.g., right/left taillights at the back of the vehicle); (3) headlights of the vehicle (e.g., right/left headlights at the front of the vehicle); (4) license plate(s); and/or other like features of universal vehicle keypoints. This architecture includes a descriptor embedding space model for tracking a predicted keypoint with keypoints from previous fames of a video stream, as shown in FIG. 5.

In one configuration, the 2D keypoint detection and tracking framework 500 is composed of a first shared image encoder backbone 510 and a second shared image encoder backbone 550. In this configuration, the 2D semantic keypoint detection and tracking framework 500 is shown receiving previous frame(s) (T−1) 502 and a current frame (T) 508 of a monocular video stream. For example, the second shared image encoder backbone 550 receives the current frame T 508 and extracts relevant appearance and geometric features for salient vehicle keypoint extraction by generating a second keypoint heatmap 552. The second keypoint heatmap 552 is provided to a second keypoint detector head 562 and a second keypoint descriptor head 564 of a second keypoint prediction stage 560 of the 2D semantic keypoint detection and tracking framework 500.

Similarly, processing of the previous frame(s) T−1 502 is performed by the first shared image encoder backbone 510 receiving the previous frame(s) T−1 502. The first shared image encoder backbone 510 extracts relevant appearance and geometric features for salient vehicle keypoint extraction by generating a first keypoint heatmap 512. The first keypoint heatmap 512 is provided to a first keypoint detector head 522 and a first descriptor head 524 of a first keypoint prediction stage 520 of the 2D semantic keypoint detection and tracking framework 500.

In one configuration of the 2D semantic keypoint detection and tracking framework 500, the second keypoint detector head 562 of the second keypoint prediction stage 560 feeds features from the second shared image encoder backbone 550 to an inference model 570. In this configuration, the inference model 570 includes shared convolutional layer 572 followed by two fully-connected (FC) layers in parallel. For example a first FC layer 574 is trained to predict a keypoint class score 577. In addition, a second FC layer 576 is trained to predict a keypoint offset 578 (e.g., an offset to a nearest keypoint) for each respective pixel location of the current frame T 508. The keypoint class score 577 and the keypoint offset 578 enable a point-wise association between predicted salient vehicle keypoints 580 of the current frame T 508 and pixel locations of the current frame T 508.

This process is also performed to predict previous salient vehicle keypoints in the previous frame(s) T−1 502 to establish the salient vehicle keypoints in the previous frame(s) T−1 502. In this configuration the first keypoint detector head 522 of the first keypoint prediction stage 520 feeds features from the first shared image encoder backbone 510 to a first inference model 530. In this configuration, the first inference model 530 includes a shared convolutional network 532 followed by two fully-connected (FC) layers in parallel. For example, a first FC layer 534 is trained to predict a keypoint class score 537. In addition, a second FC layer 536 is trained to predict a keypoint offset 538 (e.g., an offset to a nearest keypoint) for each respective pixel location of the current frame T 508. The keypoint class score 537 and the keypoint offset 538 also enable a point-wise associate of salient vehicle keypoints 592 of the previous frame(s) T−1 502 and the predicted salient vehicle keypoints 580 of the current frame T 508.

In some aspects of the present disclosure, the second keypoint descriptor head 564 of the second keypoint prediction stage 560 takes in features from the second shared image encoder backbone 550 to produce a 128-dimensional feature vector 566 for each pixel location corresponding to the predicted salient vehicle keypoints 580. The second keypoint descriptor head 564 may be trained in a self-supervised manner. For example, during training, a pair of homographies are sampled to warp an input image (e.g., the current frame T 508) in two different manners. In this example, descriptor embeddings 568 are trained using a triplet loss to encourage corresponding keypoints to have similar descriptors.

During training, descriptor triplets are sampled using ground-truth keypoint coordinates and known homographic correspondence to form a descriptor embedding space model 540 based on the processing of descriptor embeddings 528 of the previous frame(s) T−1 502. Some aspects of the present disclosure use known transformations of salient vehicle keypoints to define embedded descriptors of the salient vehicle keypoints in subsequent images of the video stream. For example, known transformations (e.g., 90° rotation) are determined from multiple warping of a sample image. In this aspect of the present disclosure, the descriptor embeddings (e.g., 528/568) are used to find corresponding keypoints in the warped images of the current frame T 508 and the previous frame(s) T−1 502.

In this aspect of the present disclosure, the first descriptor head 524 of the first keypoint prediction stage 520 takes in features from the second shared image encoder backbone 550 to produce a 128-dimensional feature vector 526. For example, the 128-dimensional feature vector 526 is provided for each pixel location corresponding to the salient vehicle keypoints 592 of the previous frame(s) T−1 502. The first descriptor head 524 may be trained in a self-supervised manner. For example, during training, a pair of homographies are sampled to warp an input image (e.g., the previous frame(s) T−1 502) in two different manners. In this example, descriptor embeddings 528 are trained using a triplet loss to encourage corresponding keypoints to have similar descriptors. During training, descriptor triplets are sampled using ground-truth keypoint coordinates and known homographic correspondence to form the descriptor embedding space model 540 based on the processing of descriptor embeddings 528 of the previous frame(s) T−1 502.

During inference on videos, the predicted salient vehicle keypoints 580 based on the current frame T 508 are matched with keypoints in the previous frame(s) T−1 502 using greedy matching as a matching operation 590 within the descriptor embedding space model 540. In some aspects of the present disclosure, the first keypoint detector head 522 and the second keypoint detector head 562 are trained in a supervised manner. For example, the first keypoint detector head 522 and the second keypoint detector head 562 are trained with keypoint classification trained using a focal loss. In addition, the first keypoint detector head 522 and the second keypoint detector head 562 are trained to perform keypoint offsets using a smooth L1 loss. In aspects of the present disclosure, during inference, the inference model 570 fuses and inputs the keypoint class score 577 and the keypoint offset 578 into a non-maxima suppression to produce the predicted salient vehicle keypoints 580. As described, a non-maxima suppression may refer to a heuristic commonly used in the art to discard a set of keypoints that are redundant. For example, the set of redundant keypoints may be based on a user-defined overlap threshold (e.g., a spatial proximity, or some other measure of similarity). An object tracking process is further described in FIG. 6.

Figure 6:
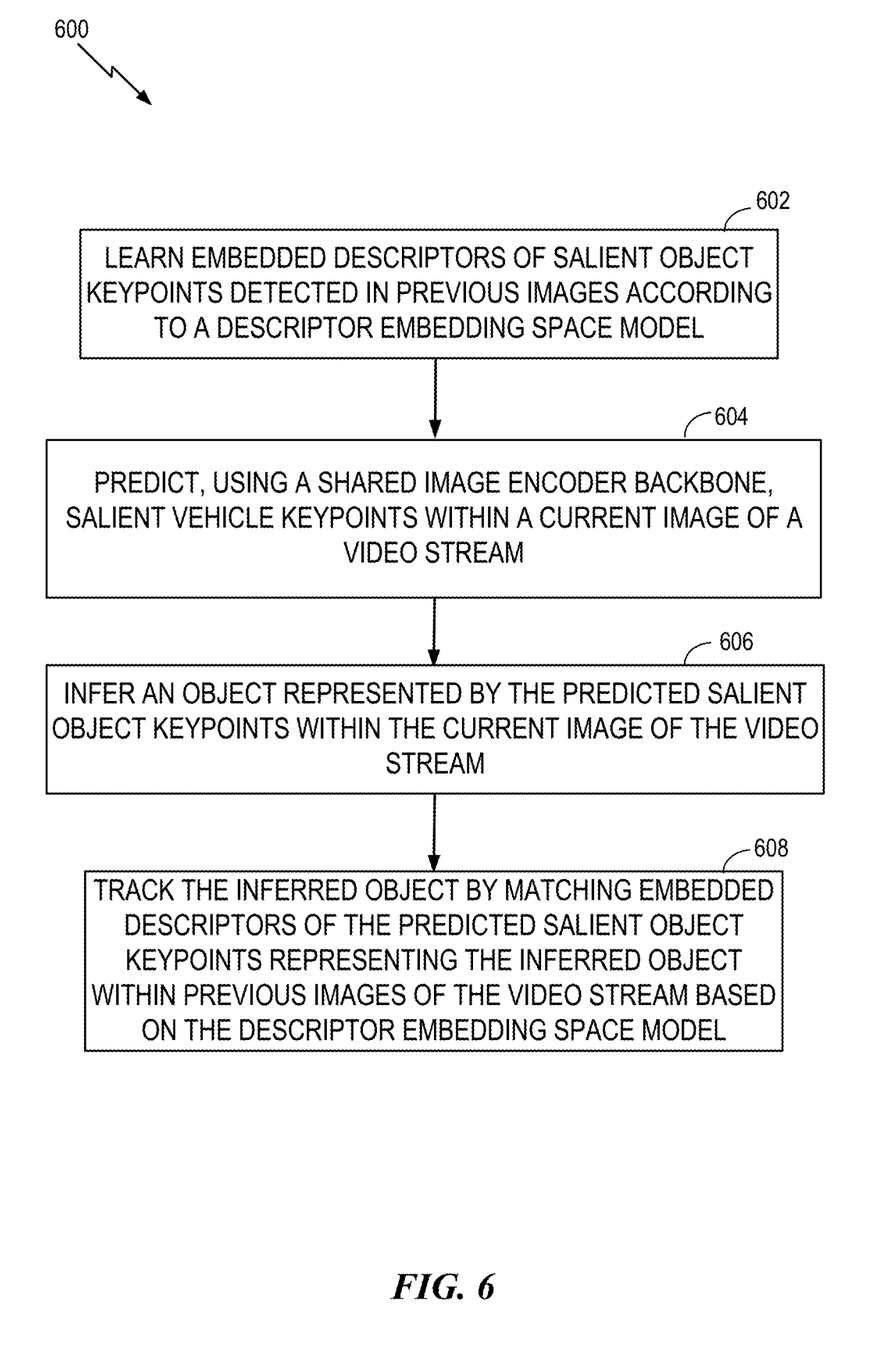
FIG. 6 is a flowchart illustrating a method for monocular 2D semantic keypoint detection and tracking, according to aspects of the present disclosure.

FIG. 6 is a flowchart illustrating a method for semantic keypoint detection and tracking, according to aspects of the present disclosure. The method 600 begins at block 602, in which embedded descriptors of salient object keypoints detected in previous images are learned according to a descriptor embedding space model. For example, as shown in FIG. 5, salient vehicle keypoints are identified and descriptors are embedded within the salient vehicle keypoints to enable keypoint tracking of an associated vehicle between frames. This architecture includes a descriptor embedding space model 540 for salient vehicle keypoint tracking within the previous fame(s) T−1 502 of a video stream. For example, during training, descriptor triplets are sampled using ground-truth keypoint coordinates and known homographic correspondence (e.g., 90° rotation) to form the descriptor embedding space model 540 based on the processing of descriptor embeddings 528 of the previous frame(s) T−1 502.

At block 604, salient vehicle keypoints are predicted within a current image of a video stream using a shared image encoder backbone. For example, as shown in FIG. 5, the 2D semantic keypoint detection and tracking framework 500 is composed of a first shared image encoder backbone 510 and a second shared image encoder backbone 550. In this configuration, the 2D semantic keypoint detection and tracking framework 500 is shown receiving previous frame(s) T−1 502 and a current frame T 508 of a monocular video stream. For example, the second shared image encoder backbone 550 receives the current frame T 508 and extracts relevant appearance and geometric features for salient vehicle keypoint extraction by generating a second keypoint heatmap 552. The second keypoint heatmap 552 is provided to a second keypoint detector head 562 and a second keypoint descriptor head 564 of a second keypoint prediction stage 560 of the 2D semantic keypoint detection and tracking framework 500.

At block 606, an object represented by the predicted salient object keypoints is inferred within a current image of a video stream. For example, as shown in FIG. 5, the second keypoint detector head 562 of the second keypoint prediction stage 560 feeds features from the second shared image encoder backbone 550 to the inference model 570. In this configuration, the inference model 570 includes shared convolutional layer 572 followed by two fully-connected (FC) layers in parallel. For example, the first FC layer 574 is trained to predict a keypoint class score 577. In addition, a second FC layer 576 is trained to predict a keypoint offset 578 (e.g., an offset to a nearest keypoint) for each respective pixel location of the current frame T 508.

According to aspects of the present disclosure, the keypoint class score 577 and the keypoint offset 578 enable a point-wise association between the predicted salient vehicle keypoints 580 of the current frame T 508 and pixel locations of the current frame T 580 to infer an object represented by the predicted salient vehicle keypoints 580. For example, the keypoint offset 578 is used to associate the predicted salient vehicle keypoints 580 to pixel locations in the current frame T 508. The keypoint class score 577 may indicate a quality or confidence of a keypoint that is used to rank the predicted salient vehicle keypoints 580 or discard them during the non-maxima suppression stage.

At block 608, the inferred object is tracked by matching embedded descriptors of the predicted salient object keypoints representing the inferred object within previous images of the video stream based on the descriptor embedding space model. For example, as shown in FIG. 5, during inference on videos, the predicted salient vehicle keypoints 580 based on the current frame T 508 are matched with keypoints in the previous frame(s) T−1 502 using the matching operation 590 within the descriptor embedding space model 540. In some aspects of the present disclosure, the first keypoint detector head 522 and the second keypoint detector head 562 are trained with keypoint classification trained using a focal loss. In addition, the first keypoint detector head 522 and the second keypoint detector head 562 are trained to perform keypoint offsets using a smooth L1 loss. In aspects of the present disclosure, during inference, the inference model 570 fuses and inputs the keypoint class score 577 and the keypoint offset 578 into a non-maxima suppression to produce the predicted salient vehicle keypoints 580. The method 600 also includes planning a trajectory of an ego vehicle according to the tracking of the inferred object.

The method 600 may include generating known transformations of an input image. Once generated, the method 600 may also include warping the input image to form a warped image. Once the warped image is generated, the method 600 may include extracting keypoints and descriptors from the input image and the warped image. The method 600 further includes computing corresponding keypoints through the known transformation between the input image and warped image. The method 600 further includes ensuring descriptors of the corresponding keypoints match the extracted keypoints.

Aspects of the present disclosure are directed to an architecture that includes an end-to-end 2D semantic keypoint detector and tracker using the keypoint inference model 316 of FIG. 3. In this aspect of the present disclosure, salient vehicle keypoints are identified and descriptors are embedded within the salient vehicle keypoints to enable keypoint tracking of an associated vehicle between frames. This architecture includes a descriptor embedding space model 540 for salient vehicle keypoint tracking within previous fames of a video stream, for example, as shown in FIG. 5.

In some aspects of the present disclosure, the method 600 may be performed by the SOC 100 (FIG. 1) or the software architecture 200 (FIG. 2) of the ego vehicle 150 (FIG. 1). That is, each of the elements of method 600 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for 2D semantic keypoint detection and tracking, comprising:
    learning embedded descriptors of salient vehicle object keypoints detected in previous images to train a shared descriptor embedding space model;
    predicting, using a shared image encoder backbone, salient vehicle object keypoints within a current image of a video stream;
    inferring a vehicle represented by the predicted, salient vehicle object keypoints within the current image of the video stream;
    processing, by a trained shared descriptor embedding space model, embedded descriptors of the salient vehicle object keypoints detected in the previous frames and embedded descriptors of the predicted, salient vehicle object keypoints representing the inferred vehicle within the current frame;
    matching the predicted, salient vehicle object keypoints representing the inferred vehicle within the current frame with salient vehicle object keypoints representing the inferred vehicle within the previous images of the video stream based on the trained descriptor embedding space model; and
    tracking the inferred vehicle within the previous images, the current image, and subsequent images of the video stream based on the matching.

2. The method of claim 1, in which learning the embedded descriptors comprises:
    predicting the salient vehicle object keypoints and the descriptors within frames of the video stream; and
    identifying, using the descriptors, associated keypoints at different frames of the video stream corresponding to the salient vehicle object keypoints based on the embedding space model.

3. The method of claim 2, further comprising:
    generating known transformations of an input image;
    warping the input image to form a warped image;
    extracting keypoints and the descriptors from the input image and the warped image;
    computing corresponding keypoints through the known transformations between the input image and the warped image; and
    ensuring the descriptors of the corresponding keypoints match the extracted keypoints.

4. The method of claim 1, in which predicting the salient vehicle object keypoints comprises:
    extracting, using the shared image encoder backbone, the salient vehicle object keypoints within the current image of the video stream based on relevant appearance and geometric features of the current image; and
    generating a keypoint heatmap based on the salient vehicle object keypoints extracted using the shared image encoder backbone.

5. The method of claim 1, further comprising:
    generating, using a descriptor head, the embedded descriptors of the salient vehicle object keypoints; and
    computing the salient vehicle object keypoints in the previous images of the video stream using the embedded descriptors generated using the descriptor head.

6. The method of claim 1, in which the salient vehicle object keypoints approximate geometry/spatial relationships of a rigid-body object of the vehicle.

7. The method of claim 1, further comprising planning a trajectory of an ego vehicle according to the tracking of the inferred vehicle.

8. A non-transitory computer-readable medium having program code recorded thereon for 2D semantic keypoint detection and tracking, the program code being executed by a processor and comprising:
    program code to learn embedded descriptors of salient vehicle object keypoints detected in previous images to train a shared descriptor embedding space model;
    program code to predict, using a shared image encoder backbone, salient vehicle object keypoints within a current image of a video stream;
    program code to infer a vehicle represented by the predicted, salient vehicle object keypoints within the current image of the video stream;
    program code to process, by a trained shared descriptor embedding space model, embedded descriptors of the salient vehicle object keypoints detected in the previous frames and embedded descriptors of the predicted, salient vehicle object keypoints representing the inferred object within the current frame;
    program code to match the predicted, salient vehicle object keypoints representing the inferred object vehicle within the current frame with salient vehicle object keypoints representing the inferred vehicle within the previous images of the video stream based on the descriptor embedding space model; and program code to track the inferred vehicle within the previous images, the current image, and subsequent images of the video stream based on the program code to match.

9. The non-transitory computer-readable medium of claim 8, in which the program code to learn the embedded descriptors comprises:
program code to predict the salient vehicle object keypoints and the descriptors within frames of the video stream; and
program code to identify, using the descriptors, associated keypoints at different frames of the video stream corresponding to the salient vehicle object keypoints based on the embedding space model.

10. The non-transitory computer-readable medium of claim 9, further comprising:
program code to generate known transformations of an input image;
program code to warp the input image to form a warped image;
program code to extract keypoints and the descriptors from the input image and the warped image;
program code to compute corresponding keypoints through the known transformations between the input image and the warped image; and
program code to ensure the descriptors of the corresponding keypoints match extracted keypoints.

11. The non-transitory computer-readable medium of claim 8, in which the program code to predict the salient vehicle object keypoints comprises:
program code to extract, using the shared image encoder backbone, the salient vehicle object keypoints within the current image of the video stream based on relevant appearance and geometric features of the current image; and
program code to generate a keypoint heatmap based on the salient vehicle object keypoints extracted using the shared image encoder backbone.

12. The non-transitory computer-readable medium of claim 8, further comprising:
program code to generate, using a descriptor head, the embedded descriptors of the salient vehicle object keypoints; and program code to compute the salient vehicle object keypoints in the previous images of the video stream using the embedded descriptors generated using the descriptor head.

13. The non-transitory computer-readable medium of claim 8, in which the salient vehicle object keypoints approximate geometry/spatial relationships of a rigid-body object of the vehicle.

14. The non-transitory computer-readable medium of claim 8, further comprising program code to plan a trajectory of an ego vehicle according to the program code to track the inferred vehicle.

15. A system for 2D semantic keypoint detection and tracking, the system comprising:
a semantic keypoint detection module to learn embedded descriptors of salient vehicle object keypoints detected in previous images to train a shared descriptor embedding space model;
a semantic keypoint descriptor module to predict, using a shared image encoder backbone, salient vehicle object keypoints within a current image of a video stream;
a keypoint inference model to infer a vehicle represented by the predicted, salient vehicle object keypoints within the current image of the video stream;
a trained shared descriptor embedding space model to process embedded descriptors of the salient vehicle object keypoints detected in the previous frames and embedded descriptors of the predicted, salient vehicle object keypoints representing the inferred vehicle within the current frame; and
a keypoint tracking module to match the predicted, salient vehicle object keypoints representing the inferred object vehicle within the current frame with salient vehicle object keypoints representing the inferred vehicle within the previous images of the video stream based on the descriptor embedding space model and to track the inferred vehicle within the previous images, the current image, and subsequent images of the video stream based on the match.

16. The system of claim 15, in which the salient vehicle object keypoints approximate geometry/spatial relationships of a rigid-body object of the vehicle.

17. The system of claim 15, further comprising a planner module to plan a trajectory of an ego vehicle according to the tracking of the inferred-object vehicle.

* * * * *